Apr. 17, 1923.　　　　　　　　　　　　　　　　1,452,395
A. SMITH ET AL
MACHINE FOR RAISING OR DIGGING TURNIPS AND OTHER LIKE ROOTS
Filed Oct. 31, 1919　　　　2 Sheets-Sheet 1

Inventors
Alexander Smith
William Martin Wood
by
Attorneys

Apr. 17, 1923.  1,452,395
A. SMITH ET AL
MACHINE FOR RAISING OR DIGGING TURNIPS AND OTHER LIKE ROOTS
Filed Oct. 31, 1919   2 Sheets-Sheet 2
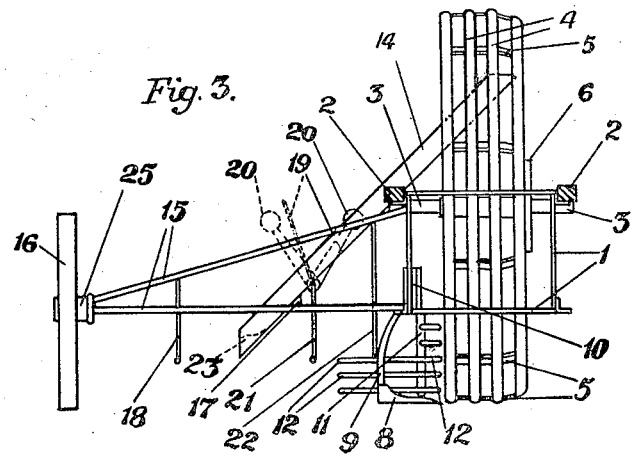
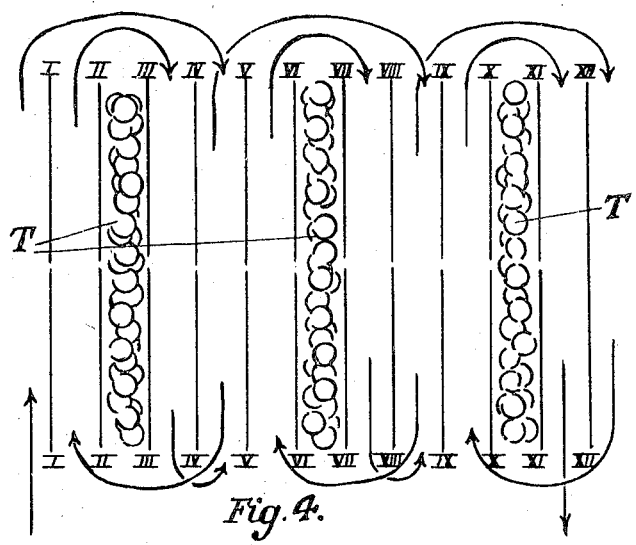
Inventors
Alexander Smith
William Martin Wood
by Knight Bro.
Attorneys Patented Apr. 17, 1923.

1,452,395

UNITED STATES PATENT OFFICE.

ALEXANDER SMITH, OF DYKEHEAD, AND WILLIAM MARTIN WOOD, OF MONTROSE, SCOTLAND.

MACHINE FOR RAISING OR DIGGING TURNIPS AND OTHER LIKE ROOTS.

Application filed October 31, 1919. Serial No. 334,819.

*To all whom it may concern:*

Be it known that we, ALEXANDER SMITH and WILLIAM MARTIN WOOD, subjects of the King of the United Kingdom of Great Britain and Ireland, and resident of Dykehead, Lethnot, Forfarshire, and 36 Baltic Street, Montrose, Scotland, have invented certain new and useful Improvements in a Machine for Raising or Digging Turnips and Other like Roots, for which we have obtained patents in Great Britain, No. 3,972, dated February 14, 1914, and Canada, No. 205,372, dated November 9, 1920, and of which the following is a specification.

This invention relates to a machine for use in raising or digging turnips and other roots of a like nature to turnips, and the invention has for its object to provide a machine in which the turnips or the like are moved sidewise into a rotary member or wheel made with a series of segmental chambers or pockets which are open at one side to receive the turnips or other roots and are adapted to convey the said roots to the top of the rotary member and to deliver the same by means of a chute or the like.

In accordance with the present invention the turnips are moved sidewise into the rotary member or wheel and are conveyed to the top of the wheel from whence they are delivered, the arrangement being such that the turnips or the like may be deposited only in every fourth drill or groove or directly into a cart or like receptacle.

In order that the invention may be clearly understood we have hereunto appended explanatory drawings which show a turnip raising machine constructed in accordance with the invention.

Figure 1:
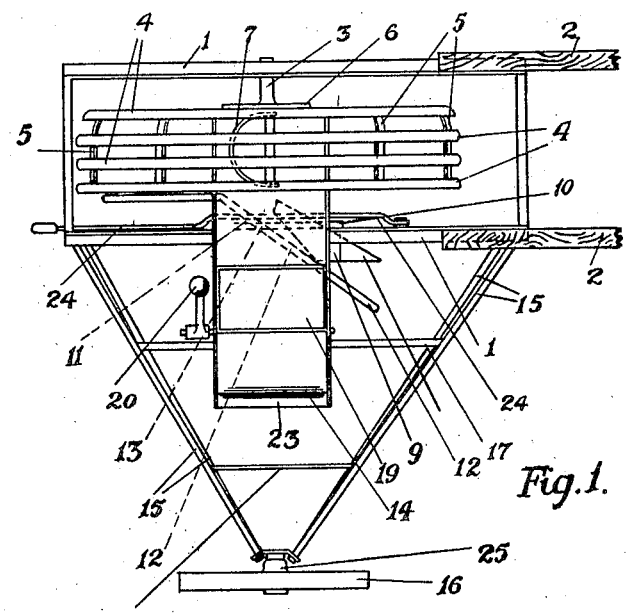
Figure 2:
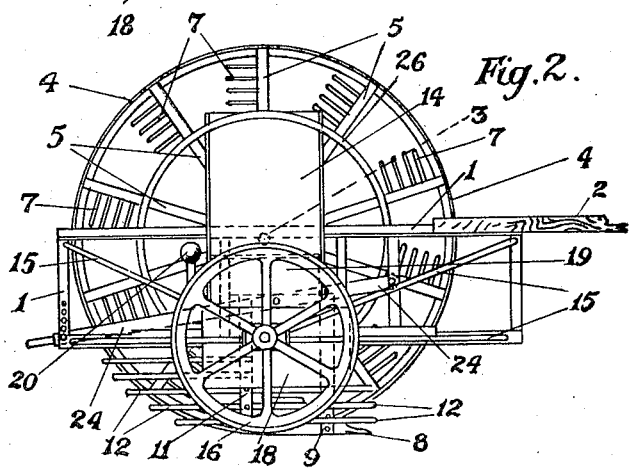

Fig. 1 is a plan view of the machine.
Fig. 2 is a side view of the same.
Fig. 3 is a view looking on the front of the machine.
Fig. 4 is a diagrammatic view showing a portion of a turnip field and indicating the path followed by the machine.

The machine is made with an open box frame 1 to the forward end of which the shafts 2 are secured and this frame is supported by the wheel or drum whose shaft 3 is mounted in bearings on the frame. This wheel or drum is made in the form of an open frame consisting of a series of rings 4 bound together by means of radial spokes 5 which extend outwards from a boss 6 at one side of the wheel and are carried across the rim and extend inwards for a short distance at the opposite side of the wheel where the ends thereof are bound together by means of an overhung ring 26. At the closed side of the wheel the end ring 4 is made of smaller diameter so that the wheel is slightly rounded off to conform to the contour of the ground whilst at the other side the end ring 4 is of the full diameter so that this side of the wheel will sink to a certain extent into the ground at the side of the turnip. Each spoke 5 is provided with a bracket or radial partition consisting of a series of semi-circular or like bars 7 (see Fig. 2 and in the upper part of the wheel at Fig. 1) which with the rim of the wheel form pockets for the reception of the turnips which are delivered thereto at the foot of the wheel.

For cutting the roots or tails of the turnips the machine is provided with a knife or blade 8 which has its cutting edge arranged at a suitable angle and is suspended by means of an arm 9 from a slide 10 mounted in guides in the side of the frame 1 and adapted to be adjusted vertically by means of a hand lever 24 pivoted on the frame in such manner that the depth of the blade 8 may be readily adjusted to suit requirements. The blade 8 is adapted to travel along beneath the turnips and to cut off the roots or tails and thereby leave the turnips free to be delivered into the wheel. The slide 10 is provided with a second depending arm 11 and these arms 9, 11 are adapted to carry a baffle or frame consisting of a series of bars 12 which are shaped in such manner (see Fig. 1) that the turnips are pressed sidewise into the pockets in the wheel. The bars 12 are made, at 13 Fig. 1, with bends or kinks by means of which the turnips are thrown smartly over in the direction of the wheel. The bars 12 are adapted to be adjusted vertically with the blade 8 by means of the hand lever 24.

For receiving the turnips from the pockets in the wheel, the machine is provided with a chute 14 which may be made of sheet metal or the like but is preferably made up from metal bars or strips between which the earth and stones and the like may freely pass. The frame 1 of the machine is provided with an outrigger or extension consisting of four tubes or bars 15 which carry a small bearing wheel 16 and have a cross bar 17 for the support of the chute 14 which is secured to this cross bar 17 and to the frame 1 in such manner that the upper end thereof extends sidewise into the upper part of the wheel between the axis and the overhung ring 26; and the arrangement is such that the turnips are carried up to the top of the wheel in the pockets and are there delivered to the chute 14, and for retaining the turnips in the pockets until they reach the chute a curved guide may extend downwards from the top of the chute. At the lower or discharge end of the chute a baffle or the like 18 may be provided for preventing the turnips rebounding from the chute and getting out of the required line, and the end of the chute 14 may be fitted with a transverse stop or rib 23 to arrest the fall of the turnips and allow them to drop gently over the end of the chute. In order that the point of discharge from the chute may be altered at will there is provided a hinged portion 19 having a weighted lever 20 by means of which it may be retained in line with the surface of the chute or in the raised position indicated in dotted lines at Fig. 3. When the portion 19 is placed in the position indicated in dotted lines at Fig. 3 the turnips are stopped thereby and pass through the gap or opening left in the shoot; baffles 21, 22 ensuring that the turnips fall in the required straight line.

The machine may be also provided with means whereby the leaves or shaws are first cut from the turnips, a disc knife or saw or other device of any suitable or well known type being provided for this purpose. The cutting device for the removal of the shaws may be provided on the same machine in advance of the raising means so as to remove the shaws before the turnips are raised; or the cutting and raising means may be arranged side by side so that whilst the turnips are being raised in one row the shaws are being cut from the turnips in the row adjacent thereto. If so desired, of course, the shawing of the turnips may be performed by a separate machine adapted to work in advance of the turnip raising machine.

In order that the machine may be readily adapted for use with drills of either of the two standard widths the wheel 16 is made with an elongated nave 25 so that by reversing this wheel the width of the machine may be varied.

In operation the horse between the shafts 2 walks between the drills or rows of turnips, the wheel or drum is drawn directly behind the horse and the wheel 16 runs in the third space therefrom. Referring to Fig. 4— which shows a portion of a turnip field having twelve drills or rows of turnips marked I to XII—the large wheel is drawn up the field along the left hand side of drill I (the small wheel running between drills III and IV) and the turnips from drill I are delivered to the space between the drills II and III by means of the chute 14 which has the door portion 19 arranged as shown in full lines at Fig. 3 to deliver from the extreme end of the chute. After raising all the turnips from drill I the machine is turned round at the head of the field as indicated by the arrow and the large wheel is then drawn downwards between drills IV and V (the small wheel running between drills I and II) so that the turnips from drill IV are delivered to the space between drills II and III, the door portion 19 having been left in the same position. The machine is then turned at the foot of the field and the large wheel is drawn up between the drills I and II so as to raise the turnips from drill II, the door portion 19 in this case being opened (as indicated in dotted lines at Fig. 3) so that the turnips from drill II are delivered to the space between drills II and III. At the head of the field the machine is turned and without shifting the discharge mechanism of the chute the large wheel is brought down between drills III and IV so as to discharge into the space between drills II and III. The operation is continued in this manner, the discharge mechanism of the chute being shifted only after the raising of two complete drills, i. e., each time the machine reaches the foot of the field. The arrows in Fig. 4 indicate the path followed by the horse and by the large wheel, whilst the turnips T are shown deposited in every fourth space. By thus depositing the turnips in every fourth hollow sufficient space is left between the rows of turnips to permit of a farm cart passing along therebetween for collecting the turnips.

Alternatively, the machine may be caused to firstly pick up the turnips from drills Nos. II and III (with the door 19 opened) and then to pick up the turnips from drills Nos. I and IV with the door 19 closed.

If desired, the chute 14 may be located in such a position as to discharge the turnips directly into a cart or other receptacle, preferably at the opposite side of the machine to the wheel 16, or an elevator or conveyor may be provided for conveying the turnips from the pockets of the wheel to the cart or like receptacle.

Claims:

1. In a root raising machine, an elevator wheel comprising the combination of spaced rings forming the rim of the wheel, an outer boss, an inner overhung ring, radial spokes extending from said boss to the overhung ring and connected to said spaced rings, and curved spaced bars extending inwardly from each of said spokes to form pockets in said wheel.

2. In combination with a root raising machine as specified in claim 1, a vertically adjustable curved ground frame for directing the roots into the elevator wheel comprising curved bars spaced above one another and each having a kink to direct the roots into the wheel pockets.

3. In combination with a root raising machine as specified in claim 1, an inclined discharge chute extending across the machine at right angles to the elevator wheel from the inner upper portion thereof.

4. In combination with a root raising machine as specified in claim 1, an inclined discharge chute having a gap therein and a hinged section adapted to close or open said gap for controlling the point of delivery of the roots.

ALEXANDER SMITH.
WILLIAM MARTIN WOOD.